United States Patent
Mao et al.

(10) Patent No.: US 12,200,652 B2
(45) Date of Patent: Jan. 14, 2025

(54) NETWORK ATTACH METHOD AND USER EQUIPMENT

(71) Applicant: VIVO MOBILE COMMUNICATION CO., LTD., Guangdong (CN)

(72) Inventors: Yuanze Mao, Guangdong (CN); Wen Wang, Guangdong (CN); Zhenhua Xie, Guangdong (CN); Yanchao Kang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 415 days.

(21) Appl. No.: 17/717,723

(22) Filed: Apr. 11, 2022

(65) Prior Publication Data

US 2022/0240214 A1   Jul. 28, 2022

Related U.S. Application Data

(63) Continuation of application No. PCT/CN2020/120450, filed on Oct. 12, 2020.

(30) Foreign Application Priority Data

Oct. 11, 2019   (CN) .......................... 201910964691.X

(51) Int. Cl.
*H04W 60/04* (2009.01)
*H04L 61/4511* (2022.01)
(Continued)

(52) U.S. Cl.
CPC ......... *H04W 60/04* (2013.01); *H04L 61/4511* (2022.05); *H04W 48/16* (2013.01);
(Continued)

(58) Field of Classification Search
None
See application file for complete search history.

(56) References Cited

U.S. PATENT DOCUMENTS

| 10,292,197 B1* | 5/2019 | Bonn ...................... H04M 15/66 |
| 2011/0199898 A1* | 8/2011 | Cho ......................... H04W 4/70 |
| | | 370/230 |

(Continued)

FOREIGN PATENT DOCUMENTS

| CN | 102960031 A | 3/2013 |
| CN | 103428798 A | 12/2013 |

(Continued)

OTHER PUBLICATIONS

First Office Action for Chinese Application No. 201910964691.X, dated Jul. 28, 2021, 9 Pages.

(Continued)

*Primary Examiner* — Lonnie V Sweet
(74) *Attorney, Agent, or Firm* — BROOKS KUSHMAN P.C.

(57) ABSTRACT

Embodiments of this application provide a network attach method and user equipment. The method is applied to UE, and includes: sending a first network attach request message to a first target gateway according to the first information; where the first information is used to indicate load information of each of M gateways; the first target gateway is at least one gateway, to which the UE has never sent a network attach request message, in the M gateways; and the first network attach request message is used to request to attach to a 3GPP network through an untrusted Wi-Fi network, where M is a positive integer.

19 Claims, 9 Drawing Sheets

(51) Int. Cl.
*H04W 48/00* (2009.01)
*H04W 48/16* (2009.01)
*H04W 84/12* (2009.01)
*H04W 88/16* (2009.01)

(52) U.S. Cl.
CPC ............ *H04W 48/17* (2013.01); *H04W 84/12* (2013.01); *H04W 88/16* (2013.01)

(56) References Cited

U.S. PATENT DOCUMENTS

| | | | |
|---|---|---|---|
| 2011/0261787 A1* | 10/2011 | Bachmann | H04W 12/037 370/331 |
| 2015/0304908 A1* | 10/2015 | Yu | H04W 36/0083 370/331 |
| 2016/0037328 A1* | 2/2016 | Raveendran | H04W 8/08 370/328 |
| 2017/0026824 A1* | 1/2017 | Kim | H04W 64/00 |
| 2017/0048739 A1* | 2/2017 | Jeong | H04W 88/06 |
| 2017/0105155 A1 | 4/2017 | Zhao et al. | |
| 2017/0195883 A1 | 7/2017 | Kwok et al. | |
| 2017/0272991 A1* | 9/2017 | Karpov | H04W 60/00 |
| 2019/0014520 A1* | 1/2019 | Karpov | H04W 4/021 |
| 2019/0124559 A1* | 4/2019 | Brown | H04W 48/16 |
| 2019/0223013 A1 | 7/2019 | Yu et al. | |

FOREIGN PATENT DOCUMENTS

| | | |
|---|---|---|
| CN | 106131832 A | 11/2016 |
| CN | 106412148 A | 2/2017 |
| CN | 106470465 A | 3/2017 |
| CN | 108432289 A | 8/2018 |
| CN | 109792787 A | 5/2019 |

OTHER PUBLICATIONS

International Search Report and Written Opinion for Application No. PCT/CN2020/120450, dated Dec. 31, 2020, 8 Pages.

Alcatel-Lucent, et al., "Support of Load and Overload Control Over S2a and S2b," SA WGZ #102, Version 12.4.0, Mar. 24-28, 2014, S2-141102, Malta, 3 Pages.

Rogers Communications, "Proposal for ePDG Selection Procedure Addressing the SA LI Requirements," SA WG2 #113, Agenda item 5.3, Jan. 25-29, 2016, S2-160270, Frigate Bay, KN, 5 Pages.

Nokia, et al., "Solving Ambiguities on Whether to Consider UEs Without UICC," SA WGZ #122, Version 14.4.0, Jun. 26-30, 2017, S2-174277, San Jose del Cabo, MX, 4 Pages.

ETSI TR, "Technical Specification: Lawful Interception; 5G Tracker Document," Jul. 28, 2017, S3i170238, Sophia Antipolis Cedex, FR, 14 Pages.

* cited by examiner

NETWORK ATTACH METHOD AND USER EQUIPMENT

CROSS-REFERENCE TO RELATED APPLICATIONS

This application is a continuation application of International Application No. PCT/CN2020/120450 filed on Oct. 12, 2020, which claims priority to Chinese Patent Application No. 201910964691.X filed on Oct. 11, 2019, which are incorporated herein by reference in their entireties.

TECHNICAL FIELD

Embodiments of this application relate to the field of communications technologies, and in particular, to a network attach method and user equipment.

BACKGROUND

Currently, for voice over Wi-Fi (Voice over Wireless Fidelity, VoWiFi) services, user equipment (UE) may attach to (access) a Third Generation Partnership Project (3GPP) network in an untrusted manner, so as to access an IP multimedia subsystem (IMS) network to perform VoWiFi registration and VoWiFi services. That is, the UE may attach to the 3GPP network through an untrusted wireless fidelity (Wi-Fi) network.

Specifically, the UE may initiate a network attach request message to an evolved packet data gateway (ePDG), so as to request to attach to the 3GPP network. If a load status of the ePDG is relatively good (for example, the load is relatively low), the ePDG may start to process a network attach procedure (for example, the processing is successful or an exception occurs during processing); or if the load status of the ePDG is relatively poor (for example, the load is relatively high), the ePDG is unable to process the network attach procedure of the UE.

In the related art, an ePDG to which the UE initiates a network attach request message is a fixed ePDG. However, the ePDG possibly cannot process the network attach procedure of the UE properly due to a relatively poor running status. As a result, the UE is unable to attach to the 3GPP network for a long time, and consequently the UE performs no VoWiFi registration procedure over a long time.

SUMMARY

Embodiments of this application provide a network attach method and user equipment.

In order to resolve the foregoing technical problem, the embodiments of this application are implemented as follows:

According to a first aspect, an embodiment of this application provides a network attach method, applied to UE. The method includes: sending a first network attach request message to a first target gateway according to the first information; where the first information is used to indicate load information of each of M gateways; the first target gateway is at least one gateway, to which the UE has never sent a network attach request message, in the M gateways; and the first network attach request message is used to request to attach to a 3GPP network through an untrusted Wi-Fi network, where M is a positive integer.

According to a second aspect, an embodiment of this application provides UE. The UE includes: a transmitting module, where the transmitting module is configured to send a first network attach request message to a first target gateway according to the first information; where the first information is used to indicate load information of each of M gateways; the first target gateway is at least one gateway, to which the UE has never sent a network attach request message, in the M gateways; and the first network attach request message is used to request to attach to a network through an untrusted Wi-Fi network, where M is a positive integer.

According to a third aspect, an embodiment of this application provides UE, including a processor, a memory, and a computer program stored in the memory and capable of running on the processor. When the computer program is executed by the processor, the steps of the network attach method described in the first aspect are implemented.

According to a fourth aspect, an embodiment of this application provides a computer-readable storage medium. A computer program is stored in the computer-readable storage medium, and when the computer program is executed by a processor, the steps of the network attach method are implemented.

In the embodiments of this application, the UE may obtain the first information that indicates the load information of each of the M gateways; and sends the first network attach request message to the first target gateway according to the first information, so as to request to attach to the 3GPP network through the untrusted Wi-Fi network. The first target gateway is at least one gateway, to which the UE has never sent the network attach request message, in the M gateways. In this way, the UE can determine, based on the first information, whether the gateways are usable, whether the gateways are full-load, and load levels of the gateways, so as to select, from the M gateways, one or more gateways whose load information meets a requirement and then send the network attach request message. For example, the UE may preferentially select a lower-load gateway and send the network attach request message, so as to reduce the probability of sending the network attach request message to a higher-load gateway or an unusable gateway.

DETAILED DESCRIPTION

Figure 1:
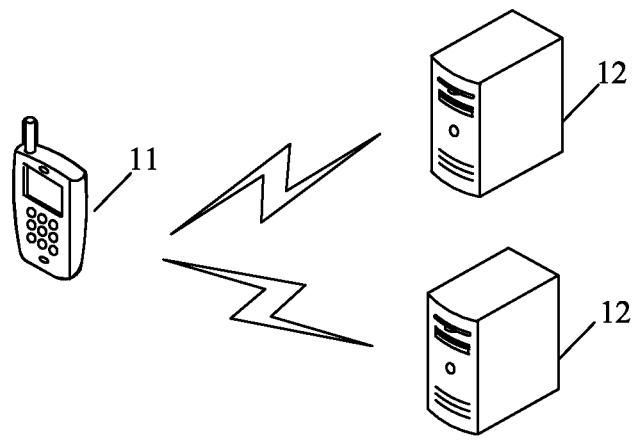
FIG. 1 is a first schematic structural diagram of a communications system according to an embodiment of this application.

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application without creative efforts shall fall within the protection scope of this application.

It should be noted that, "/" in this specification represents or, for example, A/B may represent A or B; and that the term "and/or" in this specification describes only an association relationship for describing associated objects and represents that three relationships may exist, for example, A and/or B may represent the following three cases: Only A exists, both A and B exist, and only B exists.

It should be noted that, for ease of clear description of the technical solutions of the embodiments of this application, in the embodiments of this application, the words "first", "second", and the like are used to distinguish the same items or similar items having substantially the same functions or roles, and those skilled in the art can understand that the words "first", "second", and the like do not constitute any limitation on a quantity and an execution order. For example, first information and second information are used to distinguish different information, but are not used to indicate a particular order of the information.

It should be noted that, in the embodiments of this application, words such as "an example" or "for example" are used to represent an example, an instance, or an illustration. Any embodiment or design scheme described as "an example" or "for example" in the embodiments of this application should not be construed as being more optional or advantageous than other embodiments or design schemes. To be precise, the words such as "an example" or "for example" are intended to present a related concept in a specific manner.

It should be noted that in the embodiments of this application, "of", "relevant", and "corresponding" may be sometimes used interchangeably. It should be noted that the expressed meanings are the same when a difference is not emphasized. "A plurality of" in the embodiments of this application means two or more.

For example, the network attach method provided by the embodiments of this application may be applied to a scenario in which UE requests to attach to a 3GPP network through an untrusted Wi-Fi network, and specifically may be applied to a scenario in which network attach is faulty and the UE re-requests to attach to the 3GPP network through the untrusted Wi-Fi network to access a network such as IMS.

At present, the VoWiFi service mainly has three networking schemes: untrusted access to 3GPP network (through an S2b interface), trusted access to 3GPP network (through an S2a interface), and direct access to IMS network (through an S2c interface). Specifically, for an operator that has deployed a large quantity of wireless local area network (WLAN) access points, if the trusted access to 3GPP network scheme (that is, the scheme of accessing the 3GPP network through the S2a interface) is used, upgrade and transformation are required or all WLAN access points need to be replaced directly, featuring a long construction term, high costs, and great difficulties. However, if the untrusted access to 3GPP network scheme (that is, the scheme of accessing the 3GPP network through the S2b interface) is used, openness of the public Wi-Fi network can be combined with features of high reliability and quality of service (QoS) guarantee of a core network of the operator, so as to implement seamless switching between a WLAN and a long term evolution (LTE) network. Therefore, the untrusted access to 3GPP network scheme gradually substitutes for the trusted access to 3GPP network scheme, and becomes a more feasible VoWiFi scheme currently recognized by the industry. In the untrusted access to 3GPP network scheme, the UE accesses the 3GPP network of the operator through the untrusted Wi-Fi network, and after authentication, routes a call request to the IMS for processing, so as to implement IMS services such as voice, messaging, and supplementary services. Specifically, in the untrusted access to 3GPP network scheme, an ePDG and a 3GPP authentication, authorization and accounting (AAA) server may be disposed in a communications system to implement VoWiFi services.

The newly added ePDG network element plays a very important role, and is a gateway oriented to an SWu interface in the untrusted Wi-Fi network. On the control plane, the ePDG interacts with a terminal by using an IKEv2 message to obtain extensible authentication protocol (EAP) authentication information, encapsulates the information into a Diameter message, and then interacts with the 3GPP AAA or a home subscriber server (HSS) to implement user authentication. On the user plane, the ePDG decapsulates an Internet security (IPSec) tunnel encapsulating user data and re-encapsulates into a general packet radio service tunnelling protocol (GTP) tunnel and sent it to a packet data network gateway (PDN GW (or P-GW)).

In an implementation of the related art, the UE may select an ePDG through static query, and initiate a network attach request message to a locally preset ePDG (that is, a fixed ePDG). In this case, the fixed ePDG possibly cannot process the network attach procedure of the UE properly due to a relatively poor running status. As a result, the UE is unable to attach to the 3GPP network for a long time, and consequently the UE performs no VoaWiFi registration procedure over a long time.

In another implementation of the related art, the UE may request a domain name system (DNS) server for addresses of a plurality of ePDGs. However, the plurality of ePDGs are arranged out of order, and load information of the ePDGs or usability of the ePDGs cannot be determined. In this case, the UE may send a network attach request message to any ePDG in the plurality of ePDGs, and the UE possibly first sends a network attach request message to a higher-load ePDG or an unusable ePDG, resulting in a network attach exception. Then, the UE may send a network attach request message to a lower-load ePDG. As a result, the UE is unable to attach to the 3GPP network for a long time, and consequently the UE performs no VoWiFi registration procedure over a long time.

Specifically, for the current S2B-based untrusted access scheme for the UE, reference may be made to content described on pages 38 to 40 in section 4.5.4 ePDG Selection of 3GPP TS 23.402 V16.0.0 (2019-06).

It should be noted that when UE currently initiates a network attach request message (such as VoWiFi service authentication and registration message signaling) to the ePDG, the ePDG does not respond, or the ePDG encounters a processing exception and returns a response message to the UE, which may cause the following impacts:

(1) In a case of no response from the ePDG, the UE cannot receive any response message, and consequently, the UE cannot attach to the 3GPP network or initiates reattach upon exception timeout. In addition, when the UE performs dead peer detection (DPD) to keep alive, the IPSec tunnel link may be disconnected due to no response from the ePDG.

(2) In a case that the ePDG encounters a processing exception and sends a response message to the UE to deliver an error code to the UE, after receiving the response message, the UE initiates re-registration, or initiates re-registration after a timer expires, or skips initiating registration. For example, the UE re-initiates a network attach request message to the same ePDG, that is, initiates re-registration with the same ePDG or initiates re-registration after a timer expires.

As a result, the UE does not register or does not perform the VoWiFi registration procedure for a long time.

In view of the foregoing problem, the embodiments of this application provide a network attach method and user equipment UE. The UE may obtain first information indicating load information of each of M gateways; and send a first network attach request message to a first target gateway according to the first information, so as to request to attach to a 3GPP network through an untrusted Wi-Fi network. The first target gateway is at least one gateway, to which the UE has never sent the network attach request message, in the M gateways. In this way, the UE can determine, based on the first information, whether the gateways are usable, whether the gateways are full-load, and load levels of the gateways, so as to select, from the M gateways, one or more gateways whose load information meets a requirement and then send the network attach request message. For example, the UE may preferentially select a lower-load gateway and send the network attach request message, so as to reduce the probability of sending the network attach request message to a higher-load gateway or an unusable gateway. Compared with a process in the related art in which UE initiates a network attach request message to a fixed gateway multiple times or a process in which the UE randomly sends a network attach request message to a gateway without load information multiple times, this embodiment helps reduce the number of network attach requests initiated by the UE. As a result, the process in which the UE successfully attaches to the 3GPP network and performs a VoWiFi registration procedure is less time-consuming, thereby improving execution efficiency and a success rate of the VoWiFi registration procedure.

The technical solutions provided in the embodiments of this application may be applied to various communications systems, such as a 5G communications system, a future evolved system, or a plurality of communication fusion systems. Examples of various application scenarios may include scenarios such as machine-to-machine (M2M), D2M, macro-micro communication, enhanced mobile Internet (enhanced Mobile Broadband, eMBB), ultra-reliable low-latency communications (uRLLC), and mass machine type communication (mMTC). These scenarios include, but are not limited to, scenarios such as communication between UEs, communication between network devices, or communication between a network device and UE. The embodiments of this application can be applied to communication between a network device and UE, or communication between UEs, or communication between network devices in a 5G communications system.

FIG. 1 is a possible schematic structural diagram of a communications system included in the embodiments of this application. As shown in FIG. 1, the communications system includes a terminal device 11 and at least two gateways 12 that are connected.

Figure 2:
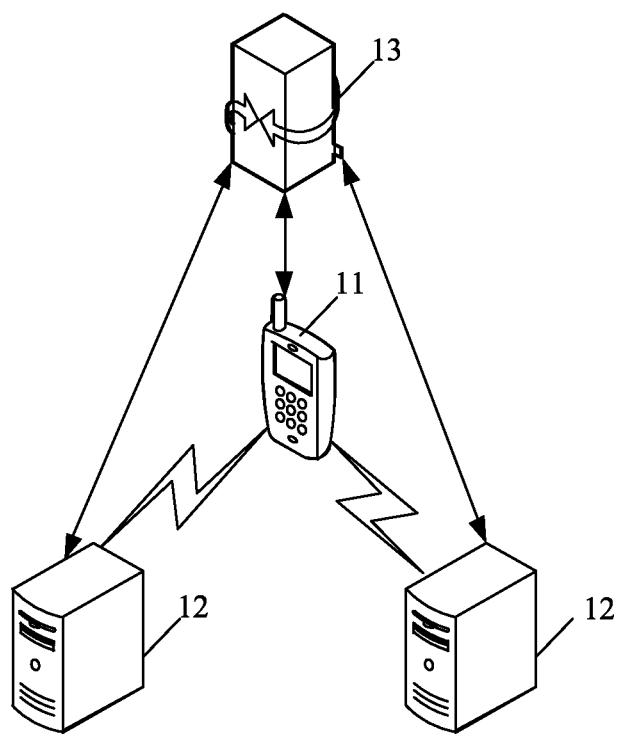
FIG. 2 is a second schematic structural diagram of a communications system according to an embodiment of this application.

With reference to FIG. 1, FIG. 2 is another possible schematic structural diagram of a communications system included in the embodiments of this application. As shown in FIG. 2, the communications system includes a terminal device 11, at least two gateways 12 connected to the terminal device 11, and a network device 13 connected to the terminal device 11 and the at least one gateway 12.

The terminal device 11 may be a wireless terminal device or may be a wired terminal device. The wireless terminal device may be a device that provides voice and/or other service data connectivity to a user, a handheld device having a wireless communication function, a computing device or other processing devices connected to a wireless modem, an in-vehicle device, a wearable device, a terminal device in a future 5G network, or a terminal device in a future evolved public land mobile network (PLMN) network, or the like. The wireless terminal device may communicate with one or more core networks via a radio access network (RAN). The wireless terminal device may be a mobile terminal device such as a mobile phone (or referred to as "cellular" phone) and a computer having a mobile terminal device, such as a portable, pocket-sized, handheld, computer built-in, or in-vehicle mobile apparatus, which exchanges voice and/or data with the radio access network; or may be a device such as a personal communication service (PCS) phone, a cordless phone, a session initiation protocol (SIP) phone, a wireless local loop (WLL) station, or a personal digital assistant (PDA). The wireless terminal device may also be a mobile device, UE, a UE terminal device, an access terminal device, a wireless communication device, a terminal device unit, a terminal device station, a mobile station, a mobile, a remote station, a remote site, a remote terminal device (Remote Terminal), a subscriber unit, a subscriber station, a user agent, a terminal device apparatus, or the like. In the following embodiments, the terminal device being UE is used as an example for description. For example, the UE being a mobile phone is used as an example in FIG. 1 and FIG. 2.

The gateway 12 may be an ePDG or an N3IWF gateway. Certainly, the gateway 12 may alternatively be other network devices in a 5G communications system or other network devices in a future evolved network, which is not specifically limited in the embodiments of this application. In the following embodiments, the network attach method provided in the embodiments of this application is described by using the gateway being an ePDG as an example.

The network device 13 may be a server, such as a DNS server, including an operator DNS server (such as an evolved packet core (EPC) DNS server) and an Internet DNS server. Specifically, a target device described below in the embodiments of this application may be the network device 13.

Figure 3:
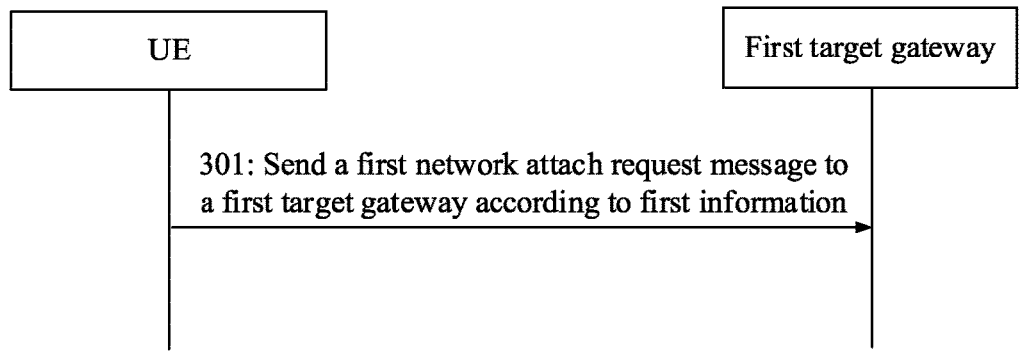
FIG. 3 is a first schematic flowchart of a network attach method according to an embodiment of this application.

FIG. 3 is a schematic flowchart of a network attach method according to an embodiment of this application. As shown in FIG. 3, the network attach method may include step 301.

Step 301: The UE sends a first network attach request message to a first target gateway according to first information.

Correspondingly, the first target gateway may receive the first network attach request message sent by the UE.

The first information is used to indicate load information of each of M gateways; the first target gateway is at least one gateway, to which the UE has never sent a network attach request message, in the M gateways; and the first network attach request message is used to request to attach to a 3GPP network through an untrusted Wi-Fi network, where M is a positive integer.

It should be noted that, in this embodiment of this application, the UE requests to attach to the 3GPP network through the untrusted Wi-Fi network, so as to initiate and perform a VoWiFi service, for example, initiating and performing a VoWiFi-related non-3GPP service.

For example, the first network attach request message may include information of the UE, such as an identifier of the UE and an address of the UE (such as an IP of the UE).

It should be emphasized that the first gateway list does not include an unusable gateway, a full-load gateway, or a gateway whose load reaches a specific threshold (the threshold may be preset by an execution body), that is, the M gateways do not include an unusable gateway, a full-load gateway, or a gateway whose load reaches a specific threshold.

It can be conceived that the network attach procedure of the UE currently processed by at least one gateway, to which the UE has currently sent a network attach request message, in the M gateways has become faulty. For example, processing of the network attach procedure of the UE becomes faulty within a specific period of time (such as within duration of a preset timer).

It can be understood that the load information of each gateway is used to indicate whether the gateway is capable of processing the network attach procedure of the UE, and a probability of successfully processing the network attach procedure of the UE by the gateway. Generally, the load information indicates that a lower-load gateway has a higher probability of successfully processing the network attach procedure of the UE. Therefore, the UE preferentially selects a lower-load gateway to process the network attach procedure of the UE, helping improve a success rate of attaching to the 3GPP network through the untrusted Wi-Fi network by the UE.

The first information may be obtained by the UE in real time.

Optionally, the first information is a first gateway list, and the first gateway list is used to indicate load information of each of M first gateways.

It can be understood that the first gateway list may be a gateway preference list, and the first gateway list includes information of each of the M first gateways.

Optionally, the first gateway list includes an address of each of the M first gateways, such as an Internet Protocol (IP) address. In addition, the addresses of the gateways are sorted by load information of the gateways, for example, in an ascending order of load indicated by the load information.

For example, in a case that the gateway is an ePDG, the first gateway list may be (ePDG list{ePDG1 ip, ePDG2 ip, . . . , ePDGn ip}), n∈{1, . . . , M}.

Figure 4:
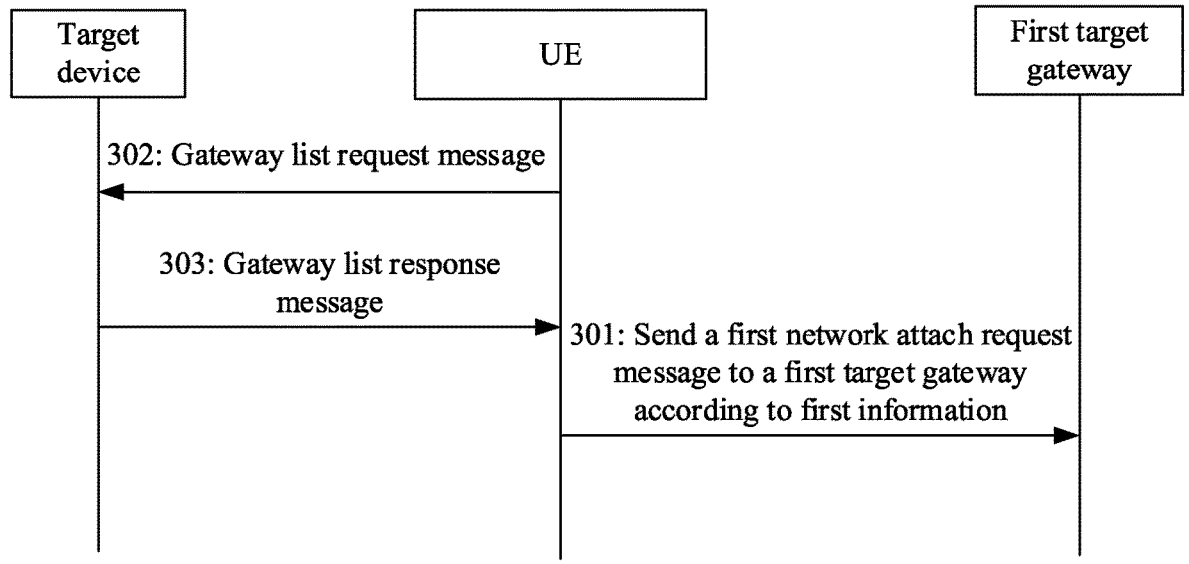
FIG. 4 is a second schematic flowchart of a network attach method according to an embodiment of this application.

Optionally, as shown in FIG. 4, in the network attach method provided by this embodiment of this application, step 302 and step 303 may alternatively be performed before step 301 to support the UE to obtain the first gateway list.

Step 302: The UE sends a gateway list request message to a target device.

Correspondingly, the target device may receive the gateway list request message from the UE.

The gateway list request message may include information of the UE, such as an identifier of the UE and an address of the UE (such as an IP of the UE).

Step 303: The UE receives a gateway list response message from the target device.

Correspondingly, the target device may send the gateway list response message to the UE in response to the gateway list request message.

The gateway list response message carries the first gateway list, and the target device includes a predetermined gateway or a DNS server.

Optionally, the predetermined gateway is a gateway in the M gateways, or the predetermined gateway is not a gateway in the M gateways.

It can be understood that, after receiving the gateway list response message from the target device and obtaining the first gateway list, the UE may store the first gateway list locally, or use the first gateway list to update a locally stored gateway list. That is, after the UE obtains the first information, the UE may store or update the first information locally.

Specifically, after receiving the gateway list response message from the target device, the UE may parse the gateway list response message to obtain the first gateway list carried in the gateway list response message.

Optionally, the target device may obtain the first gateway list in real time after receiving the gateway list request message; or the target device may obtain the first gateway list in advance before receiving the gateway list request message.

It can be understood that, in some embodiments, the target device may proactively deliver a gateway list (such as the first gateway list) to the UE, specifically by adding the gateway list to a related request message or response message.

It should be noted that, when the target device is a predetermined gateway, the UE may select a corresponding gateway through static gateway address query (that is, the UE may select a corresponding ePDG through IP address query) to perform network attach and then perform a VoWiFi network service. The predetermined gateway may be a gateway indicated by an IP address preset in the UE.

In this embodiment of this application, the DNS server may include an operator DNS server and an Internet DNS server. Information about the first gateway list may be exchanged between the operator DNS server and the Internet DNS server, and the UE may obtain the first gateway list by interacting with the Internet DNS server.

Optionally, the operator DNS server may interact with a plurality of gateways, for example, interacting with a gateway of the M gateways, to obtain the first gateway list and then store the first gateway list in the operator DNS server. Further, the operator DNS server may interact with the Internet DNS server, so that the Internet DNS server obtains the first gateway list.

Further, optionally, with running of the gateways, the operator DNS server may interact with each running gateway in real time, to obtain a new gateway list and update the stored gateway list.

Optionally, in a case that the target device is a DNS server, the gateway list request message is used to request to initiate DNS query to the DNS server by using a fully qualified domain name (FQDN), and the M gateways are gateways obtained by initiating DNS query by using the FQDN.

In this embodiment of this application, the FQDN may be preset in the UE, and the FQDN is used to indicate a DNS server. Specifically, the FQDN in the UE may be created by the UE.

It can be understood that a gateway usually exchanges load information and usability indication information (used to indicate whether the gateway can be used to process the network attach procedure of the UE) with a neighboring gateway. In this way, each gateway can identify an unusable gateway, a high-load gateway, and even a full-load gateway in the gateways interacting with the gateway, and sort the gateways based on the usability indication information and load information of the gateways, so as to obtain a gateway list that includes load information of the gateways. The gateways in the gateway list are all usable gateways.

Optionally, in this embodiment of this application, a predetermined gateway may interact with a plurality of neighboring gateways to obtain usability of the gateways and load information of the gateways. For example, the predetermined gateway may determine usable gateways from a plurality of neighboring gateways, and then determine top low-load gateways (possibly including the predetermined gateway) from the usable gateways, that is, determine M gateways to generate the first gateway list.

Optionally, in this embodiment of this application, a manner of generating the first gateway list may include the following manner 1 and manner 2.

Manner 1:

The predetermined gateway sends one request message to each of the plurality of neighboring gateways to request for load information (or load information and usability indication information) of a corresponding gateway. Then, the predetermined gateway may obtain one response message separately from some or all of the plurality of neighboring gateways, each response message carrying information of a corresponding gateway (such as load information, or load information and usability indication information), and then generates a first gateway list based on the information of the gateways.

In a case that the UE sends a network attach request message to the predetermined gateway and a network attach exception occurs, the predetermined gateway may send one request message to each of the plurality of neighboring gateways to request for the information of the corresponding gateway.

For example, when the gateway is an ePDG, one request message may be one HO_REQUEST request that is used to request a corresponding ePDG to process the network attach procedure of the UE. After receiving the HO_REQUEST request, the corresponding ePDG may return a HO_ALLOW message carrying load information, or a HO_REJECT message carrying load information. The HO_ALLOW message is used to indicate that the corresponding ePDG allows processing of the network attach procedure of the UE, and the HO_REJECT message is used to indicate that the corresponding ePDG rejects processing of the network attach procedure of the UE. Further, the predetermined gateway (that is, the predetermined ePDG denoted by ePDG0) may arrange, in ascending order of load, addresses of gateways that have returned a HO_ALLOW message, so as to generate the first gateway list.

Manner 2:

Specifically, the predetermined gateway and the plurality of neighbouring gateways may exchange respective information (such as load information, or load information and usability indication information). After the predetermined gateway exchanges the information with the plurality of neighboring gateways, addresses of top M usable gateways with lower load are sequentially arranged, so as to generate the first gateway list.

For example, in a scenario in which the gateway is an ePDG, the M gateways may exchange information, that is, the M gateways may exchange respective information (such as an address, usability indication information, and load information) at regular time intervals. The time interval for information exchange is not limited and can be determined according to actual requirements. In this way, the predetermined gateway may sort and store IPs of the gateway as the first gateway list.

Figure 5:
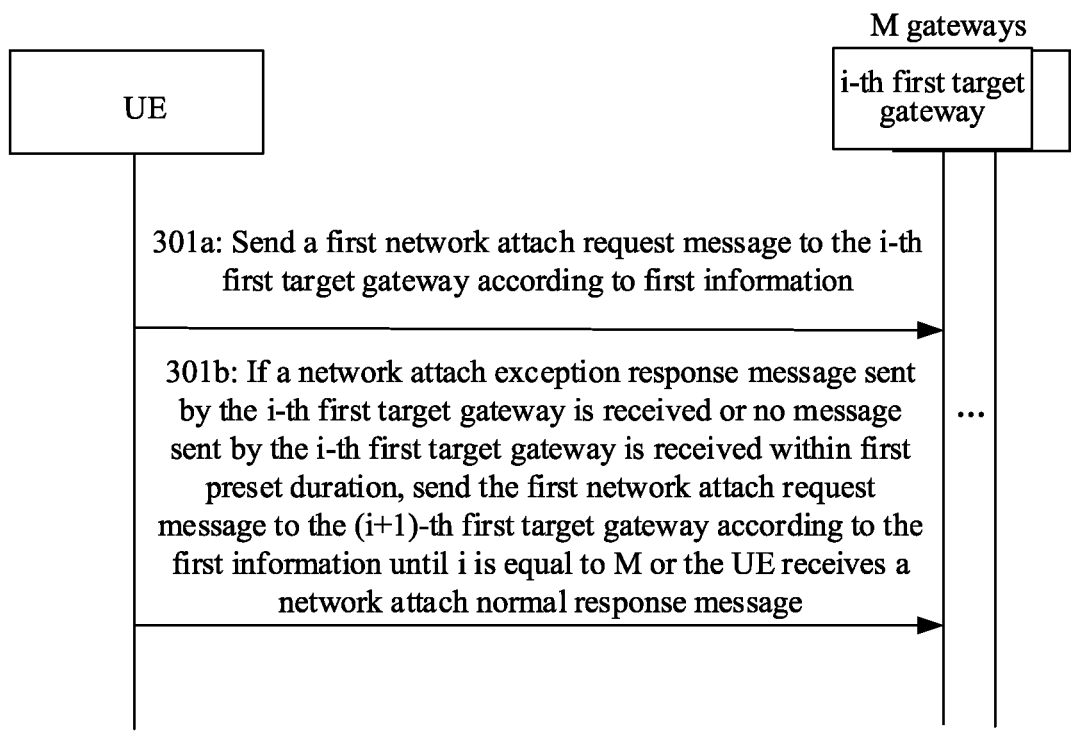
FIG. 5 is a third schematic flowchart of a network attach method according to an embodiment of this application.

Optionally, with reference to FIG. 3, as shown in FIG. 5, in the network attach method provided in this embodiment of this application, the foregoing step 301 may be implemented by step 301a and step 301b.

Step 301a: The UE sends a first network attach request message to the i-th first target gateway according to first information.

Step 301b: If a network attach exception response message sent by the i-th first target gateway is received or no message sent by the i-th first target gateway is received within first preset duration, the UE sends the first network attach request message to the (i+1)-th first target gateway according to the first information until i is equal to M or the UE receives a network attach normal response message; where i∈{1, . . . , M}.

Optionally, the first target gateway is a gateway, to which the UE has never sent a network attach request message currently and that has lowest load, in the M gateways. That is, the first target gateway is a gateway with a highest probability of successfully processing the network attach procedure of the UE currently.

It can be understood that a gateway sends, to the UE, a network attach exception response message that is used to indicate that an exception occurs during processing of the network attach procedure of the UE by the gateway. Correspondingly, one gateway may send, to the UE, a network attach success response message that is used to indicate that the gateway has successfully processed the network attach procedure of the UE, that is, no exception occurs during processing.

In this way, the UE may preferentially send a network attach request message to a lower-load gateway in the M gateways, instead of first sending a network attach request message to an unusable or higher-load gateway nor sending a network attach request message to a large quantity of gateways. Therefore, the process of successfully attaching to the 3GPP network and performing the VoWiFi registration procedure by the UE is less time-consuming.

It can be understood that, if an exception occurs in network attach, the UE may select a specific gateway from the first gateway list (that is, according to the first information) and re-initiate the network attach procedure. For example, in a case that an exception occurs in current network attach, within timing duration of a timer, the UE may initiate a network attach request message based on an IP address of a gateway in the first gateway list to initiate a VoWiFi network service. A value of the timer is preset by a specific execution body and generally should not be excessively large, for example, being set to about 120 seconds (s).

For example, in a case that the first gateway list is stored in the UE, if an unexpected event occurs, such as disconnection of the Wi-Fi network, sudden turning-off of the VoWiFi network, or sudden power-off of the UE, when the UE is reconnected to Wi-Fi within timing duration (for example, 120 s) of the timer, the UE may directly send a network attach request message to a gateway (for example, the first target gateway) in the first gateway list to initiate the VoWiFi service, or select, from the first gateway list ePDG list {ePDG1 ip, ePDG2 ip, . . . , ePDGn ip}, a gateway indicated by ePDG2 ip or a frontmost usable gateway, and then send a network attach request message to initiate the VoWiFi service.

Optionally, the UE may poll the first gateway list to send a network attach request message to each gateway in the first gateway list in turn. For example, when the i-th gateway is an ePDG indicated by ePDG1 ip, and the (i+1)-th gateway is an ePDG indicated by ePDG2 ip.

Optionally, in the network attach method provided in this embodiment of this application, step 304 and step 305 may be further included after step 301.

Step 304: In a case that the UE attaches to the 3GPP network, the UE obtains second information from the first target gateway.

Correspondingly, the first target gateway may send the second information, such as a second gateway list, to the UE.

Step 305: The UE updates the first information to the second information.

The second information is used to indicate load information of each of N gateways, and N is a positive integer.

Optionally, values of N and M are the same or different.

Optionally, in this embodiment of this application, the UE may obtain the second information at regular time intervals, and update the currently stored first information to the second information obtained in real time. Specifically, a value of the specific time interval may be determined according to actual requirements, and is not specifically limited in this embodiment of this application.

Likewise, for description of the second gateway list, reference may be made to the related description of the first gateway list in the foregoing embodiment, and details are not described again in this embodiment of this application.

Optionally, in a case that the UE has attached to the 3GPP network, that is, the UE has established a connection to the first target gateway, the UE may send a first detection request message to the first target gateway at specific time intervals (a value of the time interval may be determined according to actual requirements), so as to perform DPD detection on the first target gateway, to determine with the first target gateway whether the UE end is in a normal connected state, and to request the first target gateway for a new gateway list (such as the second gateway list represented by the second information). Then, in response to the first detection request message, the first target gateway may send, to the UE, a first detection response message indicating whether the UE end is still in the normal connected state. For example, the first detection response message is used to indicate that the UE end is in the normal connected state, and carries a new gateway list (such as the second gateway list represented by the second information), so that the UE can update the first information stored in the UE to the second information.

Optionally, in a case that the UE has attached to the 3GPP network, that is, the UE has established a connection to the first target gateway, the first target gateway may send a second detection request message to the UE at specific time intervals (a value of the time interval may be determined according to actual requirements), so as to perform DPD detection on the UE, to determine with the UE end whether the first target gateway side is in a normal connected state, and to send a new gateway list (such as the second gateway list represented by the second information) to the UE. Then, the UE may send, to the first target gateway, a second detection response message indicating whether the UE is still in the normal connected state. For example, the second detection response message is used to indicate that the UE is in a normal connected state.

It can be understood that, with running of the gateways (for example, the load information of the gateways has changed), the first target gateway may update in real time a gateway list that is generated and stored by the first target gateway. For example, the first target gateway may update the gateway list generated and stored by the first target gateway from the first gateway list to the second gateway list.

Optionally, in the network attach method provided in this embodiment of this application, step 306 and step 307 may be further included after step 305.

Step 306: The UE sends a second network attach request message to a second target gateway according to the second information.

Step 307: If a network attach exception response message sent by the second target gateway is received within second preset duration, or no message sent by the second target gateway is received within the second preset duration, or the second preset duration elapses, the UE obtains third information from the target device.

The target device includes a predetermined gateway or a DNS server. The third information is used to indicate load information of each of X gateways. The second network attach request message is used to request to attach to the 3GPP network through the untrusted Wi-Fi network, and X is a positive integer. The second target gateway is at least one gateway, to which the UE has never sent a network attach request message, in the N gateways.

Optionally, values of X and M are the same or different.

A value of the second preset duration is not specifically limited in this embodiment of this application, and may be determined according to actual requirements.

Likewise, for detailed description of the second target gateway, reference may be made to related description of the first target gateway in the foregoing embodiment, and details are not described again in this embodiment of this application.

Likewise, for detailed description of the second network attach request message, reference may be made to detailed description of the first network attach request message in the foregoing embodiment, and details are not described again in this embodiment of this application.

Further, similarly, in this embodiment of this application, for related description of obtaining the third information from the target device by the UE, reference may be made to the related description of obtaining the first information from the target device by the UE in the foregoing embodiment, and details are not described again in this embodiment of this application.

For example, the UE may obtain the third information from the predetermined gateway, or the UE may obtain the third information from a DNS server based on an FQDN stored in the UE.

Optionally, in the network attach method provided in this embodiment of this application, the foregoing step 306 may be implemented by step 306a and step 306b.

Step 306a: The UE sends a second network attach request message to the j-th second target gateway according to the second information.

Step 306b: If a network attach exception response message sent by the j-th second target gateway is received or no message sent by the j-th second target gateway is received within third preset duration, the UE sends the second network attach request message to the (j+1)-th second target gateway according to the second information until j is equal to N or the UE receives a network attach normal response message; where a. j∈{1, . . . , N}.

Optionally, the second target gateway is a gateway, to which the UE has never sent a network attach request message currently and that has lowest load, in the N gateways. That is, the second target gateway is a gateway with a highest probability of successfully processing the network attach procedure of the UE currently.

Similarly, for detailed description of the foregoing step 306a and step 306b, reference may be made to the related description of step 301a and step 301b in the foregoing embodiment, and details are not described again in this embodiment of this application.

Further, in this embodiment of this application, for a subsequent process of sending a network attach request message to a gateway of the X gateways according to the third information, reference may be made to the related descriptions of step 301a and step 301b in the foregoing embodiment. Details are not described again in this embodiment of this application.

It should be noted that the network attach method provided in this embodiment of this application can be applied to scenario 1 and scenario 2.

In scenario 1, in a case that the UE has not attached to the 3GPP network currently, the UE obtains a gateway list, for example, the UE obtains the first gateway list represented by the first information, or obtains a gateway list represented by the third information.

In scenario 2, the UE has attached to the 3GPP network currently, and has updated in real time the gateway list stored in the UE. For example, the UE updates the gateway list from the first gateway list represented by the first information to the gateway list represented by the second information.

In the following embodiment, the network attach method provided in the embodiments of this application is described by using the gateway being an ePDG as an example. Assuming that the predetermined gateway is an ePDG0, the M gateways and the N gateways all include ePDG1, ePDG2, . . . , and ePDGn ranking in ascending order.

Figure 6:
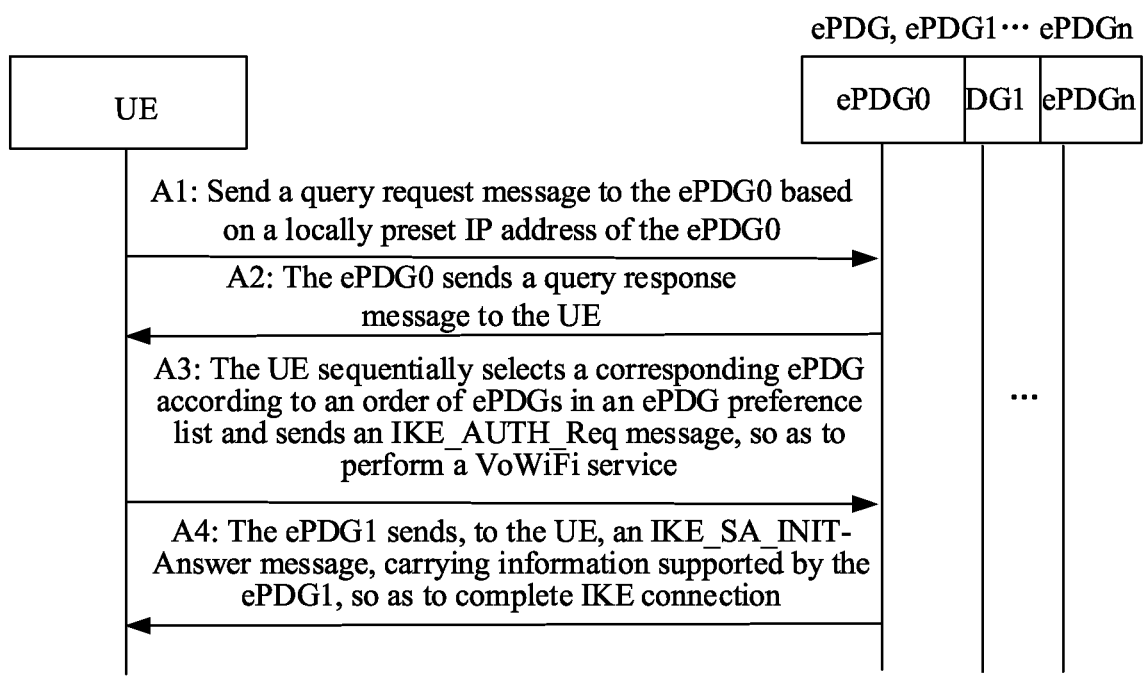
FIG. 6 is a fourth schematic flowchart of a network attach method according to an embodiment of this application.

As shown in FIG. 6, in this embodiment of this application, the network attach method may be implemented by the following steps A1 to A4.

It should be noted that the following steps A1 to A4 may be applied to the foregoing scenario 1, specifically, applied to a scenario in which the UE selects an ePDG in a manner of static IP query.

Step A1: The UE sends a query request message to the ePDG0 based on a locally preset IP address of the ePDG0.

The query request message is used to request the ePDG0 to query an ePDG preference list.

Correspondingly, the ePDG0 may receive a query request message from the UE.

Specifically, the query request message may be the gateway list request message in the foregoing embodiment, and the ePDG preference list may be the first gateway list.

Step A2: The ePDG0 sends a query response message to the UE.

The query response message carries an ePDG preference list (ePDG list{ePDG1 ip, ePDG2 ip, . . . , ePDGn ip}).

Correspondingly, the UE may receive the query response message from the ePDG0, parses the query response message to obtain the ePDG preference list, and locally stores or updates the ePDG preference list in the UE.

Specifically, the query response message may be the gateway list response message.

Step A3: The UE sequentially selects a corresponding ePDG according to an order of the ePDGs in the ePDG preference list and sends an IKE_AUTH_Req message, so as to perform the VoWiFi service.

The UE may preferentially select the ePDG1 from the ePDG list {ePDG1 ip, ePDG2 ip, . . . , ePDGn ip} and send an IKE_SA_INIT-Request message that carries an encryption algorithm supported by the UE, and then exchanges a time random number (nonces), completes key exchange algorithm (Diffie_Hellman) exchange, and prepares to establish an IKE connection, so as to request the ePDG1 to process the network attach procedure of the UE.

Correspondingly, the ePDG1 may receive a corresponding IKE_SA_INIT-Request message from the UE, and parse and process the IKE_SA_INIT-Request message.

For example, the ePDG1 may be the first target gateway, and the IKE_SA_INIT-Request message received by the ePDG1 may be the first network attach request message.

Step A4: The ePDG1 sends, to the UE, an IKE_SA_INIT-Answer message, carrying information supported by the ePDG1, so as to complete the IKE connection.

The information supported by the ePDG1 includes an address, load information, and usability indication information that are of the ePDG1.

Further, in the network attach method provided by the embodiment of this application, after step A4, subsequent steps for implementing the network attach procedure of the UE may be further performed. For example, the UE may send an IKE_AUTH_Req message to the ePDG1 to complete the 3GPP network attach procedure of the VoWiFi service.

Specifically, in the network attach method provided in this embodiment of this application, a defect that load of an ePDG cannot be shared during ePDG selection through static IP query in the related art is avoided. With this method, an ePDG may be selected based on load information during ePDG selection through static IP query, thereby improving registration efficiency and a success rate of a non-3GPP network service such as VoWiFi.

Figure 7:
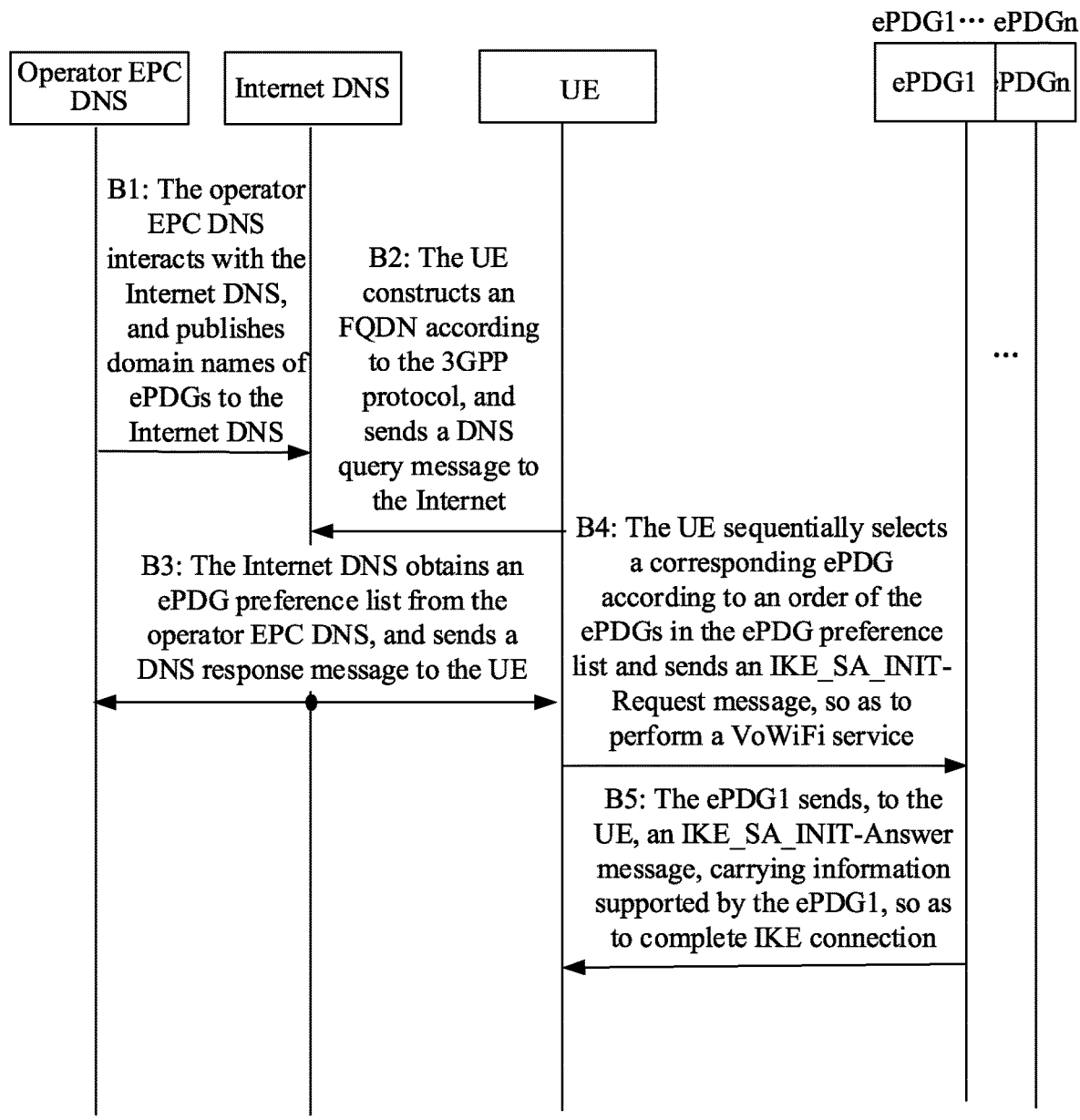
FIG. 7 is a fifth schematic flowchart of a network attach method according to an embodiment of this application.

As shown in FIG. 7, in this embodiment of this application, the network attach method may be implemented by the following steps B1 to B5.

It should be noted that the following steps B1 to B5 may be applied to the foregoing scenario 1, specifically, applied to a scenario in which the UE selects an ePDG in a manner of dynamic DNS query.

Step B1: The operator EPC DNS interacts with the Internet DNS, and publishes domain names of ePDGs to the Internet DNS.

In this embodiment of this application, the domain names of the ePDGs may be used to indicate an ePDG preference list.

Step B2: The UE constructs an FQDN according to the 3GPP protocol, and sends a DNS query message to the Internet.

The DNS query message is used by the UE to request to perform DNS resolution and query address information of the ePDG.

Specifically, the UE may construct one FQDN based on content described in the section of ePDG FQDNs Construction in 3GPP TS402 4.5.4.2.

Correspondingly, the Internet DNS may receive the DNS query message from the UE.

For example, the DNS query message may be the gateway list request message.

Step B3: The Internet DNS obtains the ePDG preference list from the operator EPC DNS, and sends a DNS response message to the UE.

Correspondingly, the UE may receive the DNS response message from the Internet DNS, parses the DNS response message to obtain the ePDG preference list, and locally stores or updates the ePDG preference list in the UE.

The DNS response message carries the ePDG preference list, so that the UE obtains an IP address of an ePDG for access, and processes VoWiFi related services.

Optionally, in response to the request from the Internet DNS, the operator EPC DNS may return information about the ePDG preference list to the Internet DNS.

For example, the DNS response message may be the gateway list response message.

Step B4: The UE sequentially selects a corresponding ePDG according to an order of the ePDGs in the ePDG preference list and sends an IKE_SA_INIT-Request message, so as to perform the VoWiFi service.

The UE may preferentially select the ePDG1 from the ePDG list {ePDG1 ip, ePDG2 ip, . . . , ePDGn ip} and send an IKE_SA_INIT-Request message that carries an encryption algorithm supported by the UE, and then exchanges a time random number (nonces), completes key exchange algorithm (Diffie_Hellman) exchange, and prepares to establish an IKE connection, so as to request the ePDG1 to process the network attach procedure of the UE.

Correspondingly, the ePDG1 may receive the corresponding IKE_SA_INIT-Request message from the UE, and parse and process the IKE_SA_INIT-Request message.

Specifically, the ePDG1 may be the first target gateway, and the IKE_SA_INIT-Request message received by the ePDG1 may be the first network attach request message.

Step B5: The ePDG1 sends, to the UE, an IKE_SA_INIT-Answer message, carrying information supported by the ePDG1, so as to complete the IKE connection.

Further, in the network attach method provided by the embodiment of this application, after step B5, subsequent steps for implementing the network attach procedure of the UE may be further performed. For example, the UE may send an IKE_AUTH_Req message to the ePDG1 to complete the 3GPP network attach procedure of the VoWiFi service.

In the network attach method provided in this embodiment of this application, a defect that an unusable ePDG cannot be identified during ePDG selection through dynamic DNS query in the related art is avoided, and the ePDG preference list is added. In this way, it is ensured that an ePDG with optimal load information is selected during ePDG selection by the UE, that is, a lowest-load ePDG is selected, thereby improving registration efficiency and a success rate of a non-3GPP network service such as VoWiFi.

Figure 8:
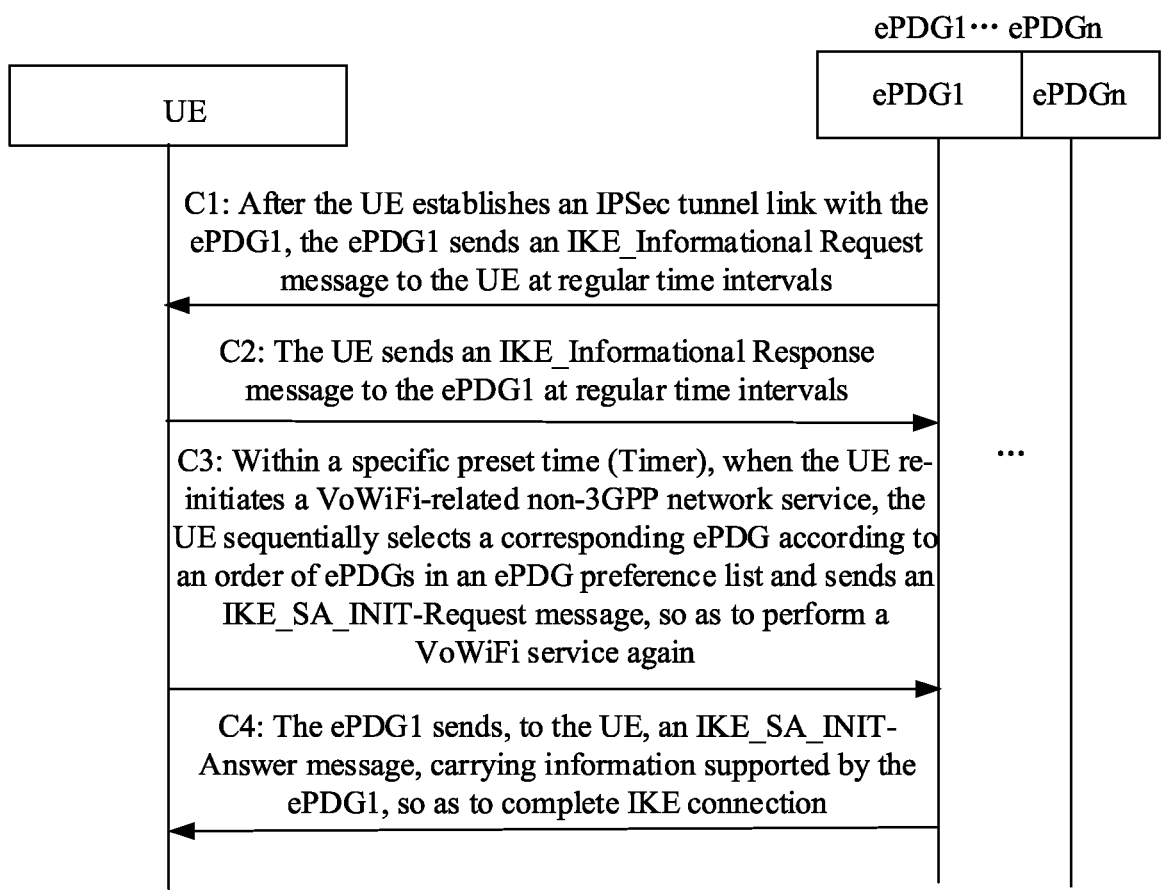
FIG. 8 is a sixth schematic flowchart of a network attach method according to an embodiment of this application.

Optionally, after the UE establishes an IPSec tunnel link with an ePDG (for example, the ePDG1), the ePDG periodically sends an IKE_Informational Request message to the UE or the UE periodically sends an IKE_Informational Request message to the ePDG, to implement the network attach method. As shown in FIG. 8, in this embodiment of this application, the network attach method may be implemented by the following steps C1 to C4. After the UE establishes an IPSec tunnel link with the ePDG1, the ePDG1 may periodically send an IKE_Informational Request message to the UE, so as to perform DPD detection.

It should be noted that the following steps C1 to C4 may be applied to the foregoing scenario 2.

Step C1: After the UE establishes an IPSec tunnel link with the ePDG1, the ePDG1 sends an IKE_Informational Request message to the UE at regular time intervals.

The IKE_Informational Request message carries an ePDG preference list that is used for updating the ePDG preference list stored on the UE side.

Specifically, in this embodiment of this application, the ePDG preference list carried in the IKE_Informational Request message may be the gateway list represented by the second information. Updating the ePDG preference list stored on the UE side may indicate that the UE updates the gateway list from the first gateway list represented by the first information to the gateway list represented by the second information, that is, indicating that the UE updates the first information to the second information.

Correspondingly, the UE may receive the IKE_Informational Request message from the ePDG1 at regular time intervals.

Step C2: The UE sends an IKE_Informational Response message to the ePDG1 at regular time intervals.

The IKE_Informational Response message is used to reply to the ePDG1 that the UE is in a normal connected state, and to update the ePDG preference list (such as the gateway list represented by the second information) stored on the UE terminal side.

Step C3: Within a specific preset time (Timer), when the UE re-initiates a VoWiFi-related non-3GPP network service, the UE sequentially selects a corresponding ePDG according to an order of the ePDGs in the ePDG preference list and sends an IKE_SA_INIT-Request message, so as to perform the VoWiFi service again.

Specifically, the UE may first send an IKE_SA_INIT-Request message to the ePDG1, and if the ePDG1 encounters a processing exception, sends an IKE_SA_INIT-Request message to the ePDG2. The UE performs retry based on addresses of the ePDGs in the ePDG preference list. If all retries fail, the UE performs retry based on a preset IP or FQDN, that is, obtains a new ePDG preference list from the preset gateway or DNS server. Then, after the preset time elapses (that is, timeout), the UE can no longer use the address of the ePDG in the ePDG preference list to process the non-3GPP service. In this case, the UE may use the UE-preset IP or FQDN to process the non-3GPP service, that is, obtaining a new ePDG preference list from the preset gateway or DNS server.

Correspondingly, the ePDG1 may receive the corresponding IKE_SA_INIT-Request message from the UE, and parse and process the corresponding IKE_SA_INIT-Request message.

Specifically, in this embodiment of this application, the ePDG1 may be the second target gateway, and the IKE_SA_INIT-Request message received by the ePDG1 may be the second network attach request message.

Step C4: The ePDG1 sends, to the UE, an IKE_SA_INIT-Answer message, carrying information supported by ePDG1, so as to complete the IKE connection.

Further, in the network attach method provided by the embodiment of this application, after step C4, subsequent steps for implementing the network attach procedure of the UE may be further performed. For example, the UE may send an IKE_AUTH_Req message to the ePDG1 to complete the 3GPP network attach procedure of the VoWiFi service.

Figure 9:
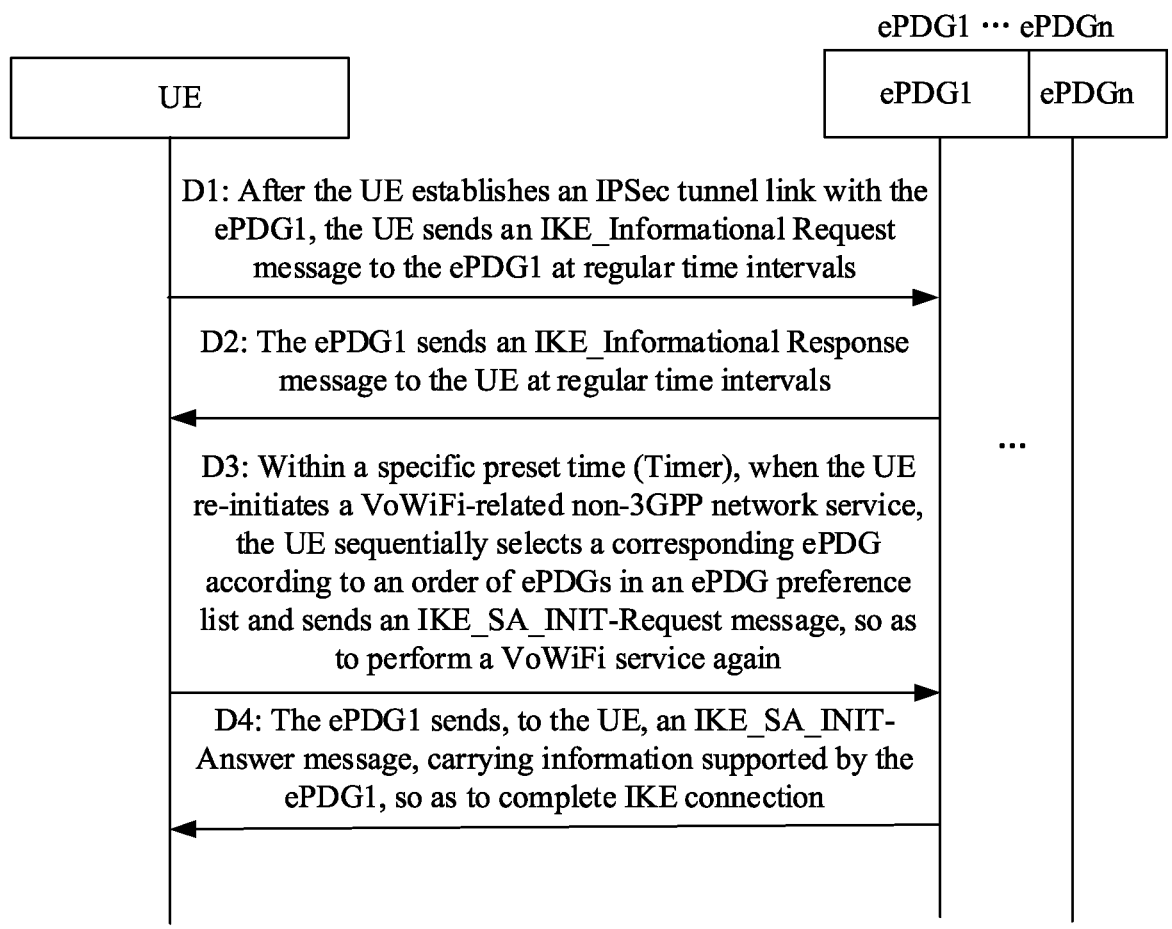
FIG. 9 is a seventh schematic flowchart of a network attach method according to an embodiment of this application.

As shown in FIG. 9, in this embodiment of this application, the network attach method may be implemented by the following steps D1 to D4. After the UE establishes an IPSec tunnel link with the ePDG1, the UE may periodically send an IKE_Informational Request message to the ePDG1, so as to perform DPD detection.

It should be noted that the following steps D1 to D4 may be applied to the foregoing scenario 2.

Step D1: After the UE establishes an IPSec tunnel link with the ePDG1, the UE sends an IKE_Informational Request message to the ePDG1 at regular time intervals to determine whether a connection status of the ePDG1 is normal.

Correspondingly, the ePDG1 may receive one IKE_Informational Request message from the UE at regular time intervals.

Step D2: The ePDG1 sends an IKE_Informational Response message to the UE at regular time intervals, to reply the connection status of the ePDG1 to the UE, and adds the ePDG preference list to the message, so as to update the ePDG preference list stored on the UE terminal side.

Correspondingly, the UE may receive the IKE_Informational Response message from the ePDG1 at regular time intervals, and update the ePDG preference list stored on the UE side.

Specifically, in this embodiment of this application, the ePDG preference list carried in the IKE_Informational Response message may be the gateway list represented by the second information. Updating the ePDG preference list stored on the UE side may indicate that the UE updates the gateway list from the first gateway list represented by the first information to the gateway list represented by the second information, that is, indicating that the UE updates the first information to the second information.

The IKE_Informational Response message is used to reply to the UE that the ePDG1 is in a normal connected state, and to indicate the UE side to update the stored ePDG preference list (such as the gateway list represented by the second information).

Step D3: Within a specific preset time (Timer), when the UE re-initiates a VoWiFi-related non-3GPP network service, the UE sequentially selects a corresponding ePDG according to an order of the ePDGs in the ePDG preference list and sends an IKE_SA_INIT-Request message, so as to perform the VoWiFi service again.

Specifically, the UE may first send an IKE_SA_INIT-Request message to the ePDG1, and if the ePDG1 encounters a processing exception, sends an IKE_SA_INIT-Request message to the ePDG2. The UE performs retry based on addresses of the ePDGs in the ePDG preference list. If all retries fail, the UE performs retry based on a preset IP or FQDN, that is, obtains a new ePDG preference list from the preset gateway or DNS server. Then, after the preset time elapses (that is, timeout), the UE can no longer use the address of the ePDG in the ePDG preference list to process the non-3GPP service. In this case, the UE may use the UE-preset IP or FQDN to process the non-3GPP service, that is, obtaining a new ePDG preference list from the preset gateway or DNS server.

Correspondingly, the ePDG1 may receive the corresponding IKE_SA_INIT-Request message from the UE, and parse and process the corresponding IKE_SA_INIT-Request message.

Specifically, in this embodiment of this application, the ePDG1 may be the second target gateway, and the IKE_SA_INIT-Request message may be the second network attach request message.

Step D4: The ePDG1 sends, to the UE, an IKE_SA_INIT-Answer message, carrying information supported by the ePDG1, so as to complete the IKE connection.

Further, in the network attach method provided by the embodiment of this application, after step C4, subsequent steps for implementing the network attach procedure of the UE may be further performed. For example, the UE may send an IKE_AUTH_Req message to the ePDG1 to complete the 3GPP network attach procedure of the VoWiFi service.

In an implementation of this application, in a case that both the UE side and the ePDG side have stored the ePDG preference list, within a specific preset time, when the UE re-initiates a VoWiFi-related non-3GPP network service, an ePDG in the ePDG preference list may be preferentially selected for service processing. In this case, an ePDG query time can be reduced, and the registration efficiency and success rate of VoWiFi network services can be improved.

Similarly, for description of the steps of performing, by the N3IWF gateway, the network attach method provided in this embodiment of this application, reference may be made to the related description of the steps of performing the network attach method by the ePDG in the foregoing embodiment, and details are not described herein.

According to the network attach method provided in this embodiment of this application, the UE may obtain the first information that indicates the load information of each of the M gateways; and send the first network attach request message to the first target gateway according to the first information, so as to request to attach to the 3GPP network through the untrusted Wi-Fi network. The first target gateway is at least one gateway, to which the UE has never sent the network attach request message, in the M gateways. In this way, the UE can determine, based on the first information, whether the gateways are usable, whether the gateways are full-load, and load levels of the gateways, so as to select, from the M gateways, one or more gateways whose load information meets a requirement and then send the network attach request message. For example, the UE may preferentially select a lower-load gateway and send the network attach request message, so as to reduce the probability of sending the network attach request message to a higher-load gateway or an unusable gateway. Then, compared with the process in the related art in which UE initiates a network attach request message to a fixed gateway multiple times and the process in which the UE randomly sends a network attach request message to a gateway without load information multiple times, this embodiment helps reduce the number of network attach requests initiated by the UE. As a result, the process in which the UE successfully attaches to the 3GPP network and performs a VoWiFi registration procedure is less time-consuming, thereby improving execution efficiency and a success rate of the VoWiFi registration procedure.

Figure 10:
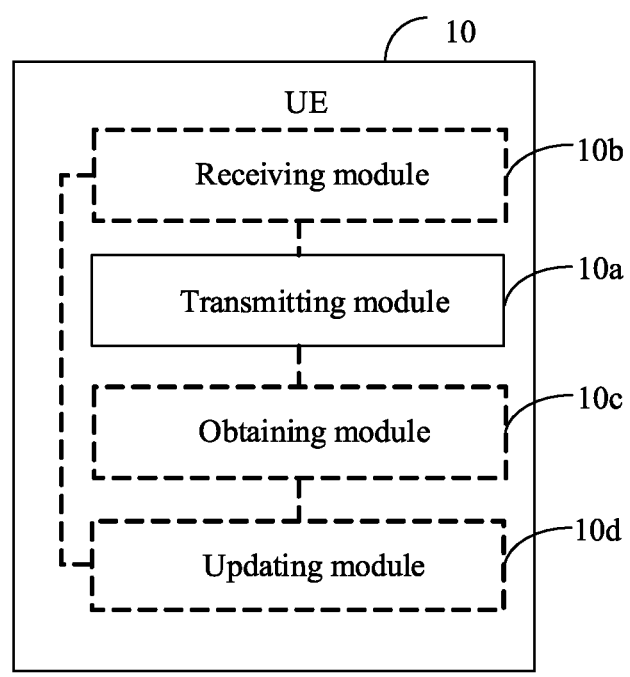
FIG. 10 is a first schematic structural diagram of UE according to an embodiment of this application.

FIG. 10 is a possible schematic structural diagram of UE according to an embodiment of this application. As shown in FIG. 10, the UE 10 includes a transmitting module 10a. The transmitting module 10a is configured to send a first network attach request message to a first target gateway according to the first information; where the first information is used to indicate load information of each of M gateways; the first target gateway is at least one gateway, to which the UE has never sent a network attach request message, in the M gateways; and the first network attach request message is used to request to attach to a 3GPP network through an untrusted Wi-Fi network, where M is a positive integer.

Optionally, the first information is a first gateway list, and the first gateway list is used to indicate load information of each of the M gateways.

Optionally, the UE 10 further includes: a receiving module 10b. The transmitting module 10a is further configured to: before sending the first network attach request message to the first target gateway according to the first information, send a gateway list request message to a target device; and the receiving module 10b is configured to receive a gateway list response message from the target device; where the gateway list response message carries the first gateway list, and the target device includes a predetermined gateway or a domain name system DNS server.

Optionally, in a case that the target device is a DNS server, the gateway list request message is used to request to initiate DNS query to the DNS server by using a fully qualified domain name FQDN, and the M gateways are gateways obtained by initiating DNS query by using the FQDN.

Optionally, the first target gateway is a gateway, to which the UE has never sent a network attach request message currently and that has lowest load, in the M gateways.

Optionally, the transmitting module 10a is specifically configured to: send the first network attach request message to the i-th first target gateway according to the first information; and if a network attach exception response message sent by the i-th first target gateway is received or no message sent by the i-th first target gateway is received within first preset duration, send the first network attach request message to the (i+1)-th first target gateway according to the first information until i is equal to M or the UE receives a network attach normal response message; where $i \in \{1, \ldots, M\}$.

Optionally, the UE 10 further includes an obtaining module 10c and an updating module 10d. The obtaining module 10c is configured to: after the transmitting module 10a sends the first network attach request message to the first target gateway according to the first information, in a case that the UE has attached to the 3GPP network, obtain second information from the first target gateway. The updating module 10d is configured to update the first information to the second information obtained by the obtaining module 10c; where the second information is used to indicate load information of each of N gateways, and N is a positive integer.

Optionally, the transmitting module 10a is further configured to: after the updating module 10d updates the first information to the second information, send a second network attach request message to a second target gateway according to the second information; and if a network attach exception response message sent by the second target gateway is received within second preset duration, or no message sent by the second target gateway is received within the second preset duration, or the second preset duration elapses, obtain third information from the target device. The target device includes a predetermined gateway or a domain name system DNS server. The third information is used to indicate load information of each of X gateways. The second network attach request message is used to request to attach to the 3GPP network through the untrusted Wi-Fi network, and X is a positive integer. The second target gateway is at least one gateway, to which the UE has never sent a network attach request message, in the N gateways.

The UE provided in this embodiment of this application may obtain the first information that indicates the load information of each of the M gateways; and send the first network attach request message to the first target gateway according to the first information, so as to request to attach to the 3GPP network through the untrusted Wi-Fi network. The first target gateway is at least one gateway, to which the UE has never sent the network attach request message, in the M gateways. In this way, the UE can determine, based on the first information, whether the gateways are usable, whether the gateways are full-load, and load levels of the gateways, so as to select, from the M gateways, one or more gateways whose load information meets a requirement and then send the network attach request message. For example, the UE may preferentially select a lower-load gateway and send the network attach request message, so as to reduce the probability of sending the network attach request message to a higher-load gateway or an unusable gateway. Then, compared with the process in the related art in which UE initiates the network attach request message to a fixed gateway multiple times and the process in which the UE randomly sends a network attach request message to a gateway without load information multiple times, this embodiment helps reduce the number of network attach requests initiated by the UE. As a result, the process in which the UE successfully attaches to the 3GPP network and performs a VoWiFi registration procedure is less time-consuming, thereby improving execution efficiency and a success rate of the VoWiFi registration procedure.

The UE provided in this embodiment of this application can implement the related steps of the foregoing method embodiment. To avoid repetition, details are not described herein again.

Figure 11:
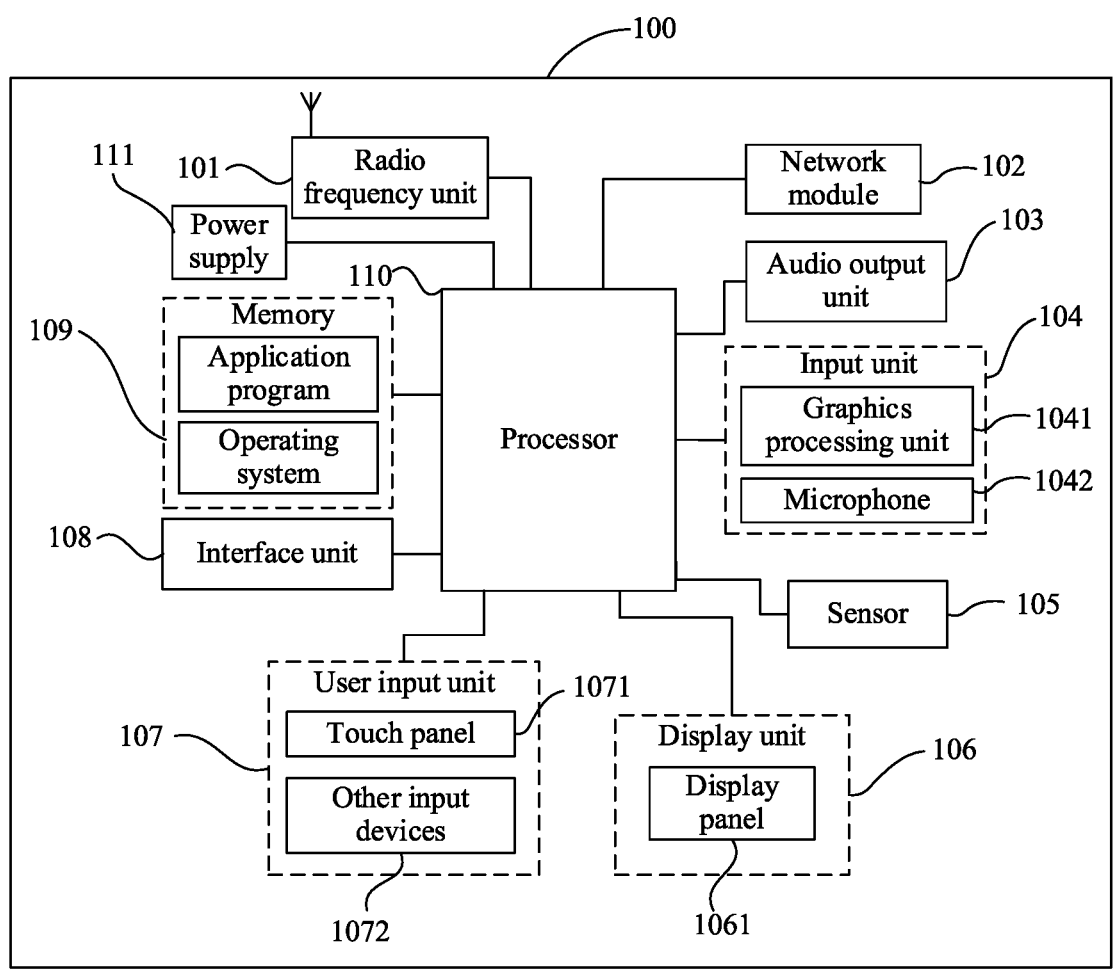
FIG. 11 is a second schematic structural diagram of UE according to an embodiment of this application.

FIG. 11 is a schematic structural diagram of hardware of a terminal device for implementing the embodiments of this application. The UE 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111. Persons skilled in the art can understand that a structure of the UE 100 shown in FIG. 11 does not constitute any limitation on the terminal device, and the UE 100 may include more or fewer components than those shown in the figure, or a combination of some components, or the components disposed differently. In this embodiment of this application, the UE 100 includes but is not limited to a mobile phone, a tablet computer, a laptop computer, a palmtop computer, an in-vehicle terminal device, a wearable device, a pedometer, and the like.

The processor 110 is configured to: control the radio frequency unit 101 to send a first network attach request message to a first target gateway according to the first information. The first information is used to indicate load information of each of M gateways; the first target gateway is at least one gateway, to which the UE has never sent a network attach request message, in the M gateways; and the first network attach request message is used to request to attach to a 3GPP network through an untrusted Wi-Fi network, where M is a positive integer.

The UE provided in this embodiment of this application may obtain the first information that indicates the load information of each of the M gateways; and send the first network attach request message to the first target gateway according to the first information, so as to request to attach to the 3GPP network through the untrusted Wi-Fi network. The first target gateway is at least one gateway, to which the UE has never sent the network attach request message, in the M gateways. In this way, the UE can determine, based on the first information, whether the gateways are usable, whether the gateways are full-load, and load levels of the gateways, so as to select, from the M gateways, one or more gateways whose load information meets a requirement and then send the network attach request message. For example, the UE may preferentially select a lower-load gateway and send the network attach request message, so as to reduce the probability of sending the network attach request message to a higher-load gateway or an unusable gateway. Then, compared with the process in the related art in which UE initiates the network attach request message to a fixed gateway multiple times and the process in which the UE randomly sends a network attach request message to a gateway without load information multiple times, this embodiment helps reduce the number of network attach requests initiated by the UE. As a result, the process in which the UE successfully attaches to the 3GPP network and performs a VoWiFi registration procedure is less time-consuming, thereby improving execution efficiency and a success rate of the VoWiFi registration procedure.

It should be understood that in this embodiment of this application, the radio frequency unit 101 may be configured to receive and send information, or to receive and send a signal in a call process, and specially, after receiving downlink data from a base station, send the downlink data to the processor 110 for processing; and also send uplink data to the base station. Generally, the radio frequency unit 101 includes but is not limited to an antenna, at least one amplifier, a transceiver, a coupler, a low noise amplifier, a duplexer, and the like. In addition, the radio frequency unit 101 may also communicate with a network and other devices via a wireless communications system.

The UE 100 provides the user with wireless broadband Internet access through the network module 102, for example, helping the user to send and receive e-mails, browse web pages, and access streaming media.

The audio output unit 103 may convert audio data received by the radio frequency unit 101 or the network module 102 or stored in the memory 109 into an audio signal and output the audio signal as a sound. In addition, the audio output unit 103 may also provide audio output (for example, a call signal reception sound or a message reception sound) related to a specific function performed by the UE 100. The audio output unit 103 includes a speaker, a buzzer, a receiver, and the like.

The input unit 104 is configured to receive an audio or video signal. The input unit 104 may include a graphics processing unit (GPU) 1041 and a microphone 1042. The graphics processing unit 1041 processes image data of a still picture or video obtained by an image capture apparatus (such as a camera) in a video capture mode or an image capture mode. A processed image frame may be displayed on the display unit 106. The image frame processed by the graphics processing unit 1041 may be stored in the memory 109 (or another storage medium) or be sent by the radio frequency unit 101 or the network module 102. The microphone 1042 is capable of receiving sounds and processing such sounds into audio data. The processed audio data can be converted into a format output that can be sent to a mobile communication base station through the radio frequency unit 101 in a telephone call mode.

The UE 100 further includes at least one sensor 105, for example, an optical sensor, a motion sensor, and another sensor. Specifically, the optical sensor may include an ambient light sensor and a proximity sensor. The ambient light sensor may adjust luminance of the display panel 1061 based on brightness of ambient light, and the proximity sensor may turn off the display panel 1061 and/or backlight when the UE 100 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the terminal device, functions related to vibration recognition (such as pedometer and tapping), and the like. The sensor 105 may also include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information input by the user or information provided to the user. The display unit 106 may include a display panel 1061, and the display panel 1061 may be configured in a form of a liquid crystal display (LCD), an organic light-emitting diode (OLED), or the like.

The user input unit 107 may be configured to receive input digit or character information, and generate a key signal input related to a user setting and function control of the UE 100. Specifically, the user input unit 107 may include a touch panel 1071 and other input devices 1072. The touch panel 1071 is also referred to as a touchscreen and can collect a touch operation (such as an operation performed by the user on the touch panel 1071 or near the touch panel 1071 with a finger or by using any proper object or accessory such as a stylus) of the user on or near the touch panel 1071. The touch panel 1071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and sends the touchpoint coordinates to the processor 110, and can receive a command sent by the processor 110 and execute the command. In addition, the touch panel 1071 may be implemented in a plurality of forms, for example, as a resistive, capacitive, infrared, or surface acoustic wave touch panel. The user input unit 107 may further include other input devices 1072 in addition to the touch panel 1071. Specifically, the other input devices 1072 may include but are not limited to a physical keyboard, a function key (such as a volume control key or a switch key), a trackball, a mouse, and a joystick. Details are not described herein.

Further, the touch panel 1071 may cover the display panel 1061. When detecting a touch operation on or near the touch panel 1071, the touch panel 1071 transmits the touch operation to the processor 110 to determine a type of a touch event. Then, the processor 110 provides a corresponding visual output on the display panel 1061 based on the type of the touch event. In FIG. 11, the touch panel 1071 and the display panel 1061 serve as two independent components to implement input and output functions of the UE 100. In some embodiments, however, the touch panel 1071 may be integrated with the display panel 1061 to implement the input and output functions of the UE 100. Details are not limited herein.

The interface unit 108 is an interface between an external apparatus and the UE 100. For example, an external apparatus may include a wired or wireless headset port, an external power supply (or a battery charger) port, a wired or wireless data port, a memory port, a port for connecting an apparatus with an identification module, an audio input/output (I/O) port, a video I/O port, an earphone port, and the like. The interface unit 108 may be configured to receive an input (for example, data information or power) from an external apparatus and transmit the received input to one or more elements within the UE 100, or may be configured to transmit data between the UE 100 and the external apparatus.

The memory 109 may be configured to store software programs and various data. The memory 109 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 109 may include a high-speed random access memory, and may further include a non-volatile memory such as a disk storage device, a flash memory device, or another volatile solid-state storage device.

The processor 110 is a control center of the UE 100. The processor 110 uses various interfaces and lines to connect all parts of the entire UE 100, and performs various functions and data processing of the UE 100 by running or executing the software program and/or module stored in the memory 109 and invoking data stored in the memory 109, thereby performing overall monitoring on the UE 100. The processor 110 may include one or more processing units. Optionally, an application processor and a modem processor may be integrated in the processor 110. The application processor primarily processes an operating system, user interfaces, application programs, and the like. The modem processor primarily processes radio communication. It can be understood that the modem processor may alternatively be not integrated in the processor 110.

The UE 100 may further include the power supply 111 (for example, a battery) supplying power to all components. Optionally, the power supply 111 may be logically connected to the processor 110 through a power management system. In this way, functions such as charge management, discharge management, and power consumption management are implemented by using the power management system.

In addition, the UE 100 includes some functional modules that are not shown. Details are not described herein.

Optionally, an embodiment of this application further provides UE, including a processor, a memory, and a computer program stored in the memory and capable of running on the processor. When the computer program is executed by the processor, the processes of the network attach method in the foregoing Embodiment 1 can be implemented and a same technical effect can be achieved. To avoid repetition, details are not described herein again.

An embodiment of this application further provides a computer-readable storage medium, where a computer program is stored in the computer-readable storage medium. When the computer program is executed by a processor, the processes of the network attach method in the foregoing embodiments, with the same technical effects achieved. To avoid repetition, details are not described herein again. The computer-readable storage medium includes a read-only memory (ROM), a random access memory (RAM), a magnetic disk, an optical disc, or the like.

It should be noted that the terms "include", "include", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this application essentially or the part contributing to the prior art may be implemented in a form of a software product. The computer software product is stored in a storage medium (such as a ROM/RAM, a magnetic disk, or an optical disc), and includes several instructions for instructing a terminal device (which may be a mobile phone, a computer, a server, an air conditioner, a network device, or the like) to perform the methods described in the plurality of embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A network attach method, comprising:
sending, by user equipment UE, a first network attach request message to a first target gateway according to the first information; wherein
the first information is used to indicate load information of each of M gateways;
the first target gateway is at least one gateway, to which the UE has never sent a network attach request message, in the M gateways; and the first network attach request message is used to request to attach to a third generation partnership project 3GPP network through an untrusted wireless fidelity Wi-Fi network, wherein M is a positive integer;
wherein after the sending, by UE, a first network attach request message to a first target gateway according to the first information, the method further comprises:
in a case that the UE has attached to the 3GPP network, obtaining, by the UE, second information from the first target gateway; and
updating, by the UE, the first information to the second information; wherein
the second information is used to indicate load information of each of N gateways, and N is a positive integer.

2. The method according to claim 1, wherein the first information is a first gateway list, and the first gateway list is used to indicate the load information of each of the M gateways.

3. The method according to claim 2, wherein before the sending, by UE, a first network attach request message to a first target gateway according to the first information, the method further comprises:
sending, by the UE, a gateway list request message to a target device; and
receiving, by the UE, a gateway list response message from the target device;
wherein
the gateway list response message carries the first gateway list, and the target device comprises a predetermined gateway or a domain name system DNS server.

4. The method according to claim 3, wherein in a case that the target device is a DNS server, the gateway list request message is used to request to initiate DNS query to the DNS server by using a fully qualified domain name FQDN, and the M gateways are gateways obtained by initiating DNS query by using the FQDN.

5. The method according to claim 1, wherein the first target gateway is a gateway, to which the UE has never sent a network attach request message currently and that has lowest load, in the M gateways.

6. The method according to claim 1, wherein the sending, by UE, a first network attach request message to a first target gateway according to the first information further comprises:
sending, by the UE, the first network attach request message to the i-th first target gateway according to the first information; and
if a network attach exception response message sent by the i-th first target gateway is received or no message sent by the i-th first target gateway is received within first preset duration, sending, by the UE, the first network attach request message to the (i+1)-th first target gateway according to the first information until i is equal to M or the UE receives a network attach normal response message; wherein
$i \in \{1, \ldots, M\}$.

7. The method according to claim 2, wherein the sending, by UE, a first network attach request message to a first target gateway according to the first information further comprises:
sending, by the UE, the first network attach request message to the i-th first target gateway according to the first information; and
if a network attach exception response message sent by the i-th first target gateway is received or no message sent by the i-th first target gateway is received within first preset duration, sending, by the UE, the first network attach request message to the (i+1)-th first target gateway according to the first information until i is equal to M or the UE receives a network attach normal response message; wherein
$i \in \{1, \ldots, M\}$.

8. The method according to claim 3, wherein the sending, by UE, a first network attach request message to a first target gateway according to the first information further comprises:
sending, by the UE, the first network attach request message to the i-th first target gateway according to the first information; and
if a network attach exception response message sent by the i-th first target gateway is received or no message sent by the i-th first target gateway is received within first preset duration, sending, by the UE, the first network attach request message to the (i+1)-th first target gateway according to the first information until i is equal to M or the UE receives a network attach normal response message; wherein
$i \in \{1, \ldots, M\}$.

9. The method according to claim 4, wherein the sending, by UE, a first network attach request message to a first target gateway according to the first information further comprises:
sending, by the UE, the first network attach request message to the i-th first target gateway according to the first information; and
if a network attach exception response message sent by the i-th first target gateway is received or no message sent by the i-th first target gateway is received within first preset duration, sending, by the UE, the first network attach request message to the (i+1)-th first target gateway according to the first information until i is equal to M or the UE receives a network attach normal response message; wherein
$i \in \{1, \ldots, M\}$.

10. The method according to claim 5, wherein the sending, by UE, a first network attach request message to a first target gateway according to the first information further comprises:
sending, by the UE, the first network attach request message to the i-th first target gateway according to the first information; and
if a network attach exception response message sent by the i-th first target gateway is received or no message sent by the i-th first target gateway is received within first preset duration, sending, by the UE, the first network attach request message to the (i+1)-th first target gateway according to the first information until i is equal to M or the UE receives a network attach normal response message; wherein
$i \in \{1, \ldots, M\}$.

11. The method according to claim 1, wherein after the updating, by the UE, the first information to the second information, the method further comprises:
sending, by the UE, a second network attach request message to a second target gateway according to the second information; and
if a network attach exception response message sent by the second target gateway is received within second preset duration, or no message sent by the second target gateway is received within the second preset duration, or the second preset duration elapses, obtaining, by the UE, third information from the target device; wherein
the target device comprises a predetermined gateway or a domain name system DNS server, the third information is used to indicate load information of each of X gateways, the second network attach request message is used to request to attach to the 3GPP network through the untrusted Wi-Fi network, and X is a positive integer; and
the second target gateway is at least one gateway, to which the UE has never sent a network attach request message, in the N gateways.

12. A terminal device, comprising a processor, a memory, and a computer program stored in the memory and capable of running on the processor, wherein when the computer program is executed by the processor, the following steps are implemented:
sending, by the terminal device, a first network attach request message to a first target gateway according to the first information; wherein
the first information is used to indicate load information of each of M gateways;
the first target gateway is at least one gateway, to which the terminal device has never sent a network attach request message, in the M gateways; and the first network attach request message is used to request to attach to a third generation partnership project 3GPP network through an untrusted wireless fidelity Wi-Fi network, wherein M is a positive integer;
wherein after the sending, by the terminal device, a first network attach request message to a first target gateway according to the first information, the following steps are further implemented:
in a case that the terminal device has attached to the 3GPP network, obtaining, by the terminal device, second information from the first target gateway; and
updating, by the terminal device, the first information to the second information;
wherein
the second information is used to indicate load information of each of N gateways, and N is a positive integer.

13. The terminal device according to claim 12, wherein the first information is a first gateway list, and the first gateway list is used to indicate the load information of each of the M gateways.

14. The terminal device according to claim 12, wherein the first target gateway is a gateway, to which the terminal device has never sent a network attach request message currently and that has lowest load, in the M gateways.

15. The terminal device according to claim 12, wherein when the computer program is executed by the processor, the following steps are further implemented:

sending, by the terminal device, the first network attach request message to the i-th first target gateway according to the first information; and if a network attach exception response message sent by the i-th first target gateway is received or no message sent by the i-th first target gateway is received within first preset duration, sending, by the terminal device, the first network attach request message to the (i+1)-th first target gateway according to the first information until i is equal to M or the terminal device receives a network attach normal response message; wherein $i \in \{1, \ldots, M\}$.

16. A computer-readable storage medium, wherein the computer-readable storage medium stores a computer program, and when the computer program is executed by a processor, the following steps are implemented:

sending a first network attach request message to a first target gateway according to the first information; wherein the first information is used to indicate load information of each of M gateways; the first target gateway is at least one gateway, which has never received a network attach request message, in the M gateways; and the first network attach request message is used to request to attach to a third generation partnership project 3GPP network through an untrusted wireless fidelity Wi-Fi network, wherein M is a positive integer;

wherein after the sending a first network attach request message to a first target gateway according to the first information, the following steps are further implemented:

in a case that the 3GPP network has been attached to, obtaining second information from the first target gateway; and updating the first information to the second information; wherein the second information is used to indicate load information of each of N gateways, and N is a positive integer.

17. The computer-readable storage medium according to claim 16, wherein the first information is a first gateway list, and the first gateway list is used to indicate the load information of each of the M gateways.

18. The computer-readable storage medium according to claim 16, wherein the first target gateway is a gateway, which has never received a network attach request message currently and that has lowest load, in the M gateways.

19. The computer-readable storage medium according to claim 16, wherein when the computer program is executed by the processor, the following steps are further implemented:

sending the first network attach request message to the i-th first target gateway according to the first information; and if a network attach exception response message sent by the i-th first target gateway is received or no message sent by the i-th first target gateway is received within first preset duration, sending the first network attach request message to the (i+1)-th first target gateway according to the first information until i is equal to M or a network attach normal response message is received;

wherein $i \in \{1, \ldots, M\}$.

* * * * *